United States Patent
Willey

(10) Patent No.: US 10,136,270 B1
(45) Date of Patent: Nov. 20, 2018

(54) SYSTEM AND METHOD FOR MONITORING RECEPTIONS OF SHORT MESSAGES

(71) Applicant: Slaine Willey, Tel Aviv (IL)

(72) Inventor: Slaine Willey, Tel Aviv (IL)

(73) Assignee: EDGE OPTI TECH LTD., Tel Aviv (IL)

( * ) Notice: Subject to any disclaimer, the term of this patent is extended or adjusted under 35 U.S.C. 154(b) by 0 days.

(21) Appl. No.: 15/893,642

(22) Filed: Feb. 11, 2018

(51) Int. Cl.
  *H04W 4/14* (2009.01)
  *H04W 40/04* (2009.01)
  *H04L 12/707* (2013.01)
  *H04L 29/08* (2006.01)
  *H04W 40/24* (2009.01)

(52) U.S. Cl.
  CPC ............... *H04W 4/14* (2013.01); *H04L 45/24* (2013.01); *H04L 67/1053* (2013.01); *H04W 40/04* (2013.01); *H04W 40/246* (2013.01)

(58) Field of Classification Search
  CPC ....... H04W 4/14; H04W 24/04; H04W 80/12; H04W 40/04; H04W 40/246; H04L 51/14; H04L 45/28; H04L 45/24; H04L 67/1053
  See application file for complete search history.

(56) References Cited

U.S. PATENT DOCUMENTS

| | | | | |
|---|---|---|---|---|
| 7,269,431 B1* | 9/2007 | Gilbert | ................. | H04L 51/066 379/100.01 |
| 7,966,027 B1* | 6/2011 | Dudziak | ................. | H04L 51/14 455/466 |
| 2007/0249378 A1* | 10/2007 | Midkiff | ................. | H04W 4/14 455/466 |
| 2013/0110939 A1* | 5/2013 | Yang | ................. | H04L 51/38 709/206 |
| 2014/0364159 A1* | 12/2014 | Murray | ................. | H04W 4/70 455/466 |
| 2016/0219420 A1* | 7/2016 | Sah | ................. | H04W 4/14 |

\* cited by examiner

*Primary Examiner* — Nizar Sivji
(74) *Attorney, Agent, or Firm* — Reches Patents

(57) ABSTRACT

A method for monitoring reception of short messages the method may include transmitting a first group of short messages over a first plurality of paths of a network that supports short message service wherein each short message of the first group comprises a link that once activated by a recipient provides a path identifier that identifies a path over which the short message successfully propagated; finding unblocked paths and blocked paths wherein each unblocked path is identified by an activated link that was activated in response to the transmitting of the first group of short messages; wherein each blocked path is not identified by an activated link despite the transmitting of the first group of short messages; selecting a group of paths of the network based at least on the finding of the unblocked paths and the blocked paths; wherein the group of paths comprises at least one unblocked path and does not include any blocked path; and transmitting at least one additional group of short messages over the group of paths of the network.

24 Claims, 3 Drawing Sheets

100

SYSTEM AND METHOD FOR MONITORING RECEPTIONS OF SHORT MESSAGES

BACKGROUND

Short Message Service (SMS) is a text messaging service component of most telephone, World Wide Web, and mobile device systems. It uses standardized communication protocols to enable mobile devices to exchange short text messages. An intermediary service can facilitate a text-to-voice conversion to be sent to landlines.

SMS, as used on modern devices, originated from radio telegraphy in radio memo pagers that used standardized phone protocols. These were defined in 1985 as part of the Global System for Mobile Communications (GSM) series of standards. The protocols allowed users to send and receive messages of up to 160 alpha-numeric characters to and from GSM mobiles. Although most SMS messages are mobile-to-mobile text messages, support for the service has expanded to include other mobile technologies, such as ANSI CDMA networks and Digital AMPS.

SMS is also employed in mobile marketing, a type of direct marketing. According to one market research report, as of 2014, the global SMS messaging business was estimated to be worth over $100 billion, accounting for almost 50 percent of all the revenue generated by mobile messaging. (See—Wikipedia.org).

Short Message Peer-to-Peer (SMPP) in the telecommunications industry is an open, industry standard protocol designed to provide a flexible data communication interface for the transfer of short message data between External Short Messaging Entities (ESMEs), Routing Entities (REs) and Message Centers (MCs).

SMPP is often used to allow third parties (e.g. value-added service providers like news organizations) to submit messages, often in bulk, but it may be used for SMS peering as well. SMPP is able to carry short messages including enhanced Messaging Service (EMS), voicemail notifications, Cell Broadcasts, Wireless Application Protocol (WAP) messages including WAP Push messages (used to deliver Multimedia Messaging Service (MMS) notifications), Unstructured Supplementary Service Data (USSD) messages and others. Because of its versatility and support for non-GSM SMS protocols, like Universal Mobile Telecommunications System (UMTS), IS-95 Code-division multiple access (CDMA), CDMA2000, American National Standards Institute-136 (ANSI-136) (Time-division multiple access—TDMA) and Integrated Digital Enhanced Network (iDEN), SMPP is the most commonly used protocol for short message exchange outside signaling system No. 7 (SS7) networks.

The SMPP uses the client-server model of operation. The Short Message Service Center (SMSC) usually acts as a server, awaiting connections from ESMEs. When SMPP is used for SMS peering, the sending MC usually acts as a client.

The protocol is based on pairs of request/response PDUs (protocol data units, or packets) exchanged over Open Systems Interconnection (OSI) layer 4 (Transmission Control Protocol (TCP) session or X.25 SVC3) connections. The well-known port assigned by the Internet Assigned Numbers authority (IANA) for SMPP when operating over TCP is 2775, but multiple arbitrary port numbers are often used in messaging environments.

Before exchanging any messages, a bind command must be sent and acknowledged. The bind command determines in which direction will be possible to send messages; bind_transmitter only allows client to submit messages to the server, bind_receiver means that the client will only receive the messages, and bind_transceiver (introduced in SMPP 3.4) allows message transfer in both directions. In the bind command the ESME identifies itself using system_id, system_type and password; the address_range field designed to contain ESME address is usually left empty. The bind command contains interface version parameter to specify which version of SMPP protocol will be used.

Message exchange may be synchronous, where each peer waits for a response for each PDU being sent, or asynchronous, where multiple requests can be issued without waiting and acknowledged in a skew order by the other peer; the number of unacknowledged requests is called a window; for the best performance both communicating sides must be configured with the same window size.

A short message may be sent over multiple paths. Some of the paths may be blocked by firewalls or erroneous routing rules.

A sender of the short message does not receive any indication about the blocking of the short message. This may result in future attempts to send short messages via a blocked path.

Short messages that are eventually blocked consume network resources that could have been used for better purposes. A large amount of blocked short messages results in a substantial waste of network resources, congestions and a waste of money.

There is a growing need to allow a better usage of network resources.

SUMMARY

There may be provided a method for monitoring reception of short messages the method may include (a) transmitting a first group of short messages over a first plurality of paths of a network that supports short message service wherein each short message of the first group comprises a link that once activated by a recipient provides a path identifier that identifies a path over which the short message successfully propagated; (b) finding unblocked paths and blocked paths wherein each unblocked path is identified by an activated link that was activated in response to the transmitting of the first group of short messages; wherein each blocked path is not identified by an activated link despite the transmitting of the first group of short messages; (c) selecting a group of paths of the network based at least on the finding of the unblocked paths and the blocked paths; wherein the group of paths comprises at least one unblocked path and does not include any blocked path; and (d) transmitting at least one additional group of short messages over the group of paths of the network.

There may be provided a computer program product that stores instructions that once executed by a computer cause the computer to perform the steps of: (a) transmitting a first group of short messages over a first plurality of paths of a network that supports short message service wherein each short message of the first group may include a link that once activated by a recipient provides a path identifier that identifies a path over which the short message successfully propagated; (b) finding unblocked paths and blocked paths wherein each unblocked path may be identified by an activated link that was activated in response to the transmitting of the first group of short messages; wherein each blocked path may not be identified by an activated link despite the transmitting of the first group of short messages; (c) selecting a group of paths of the network based at least on the finding of the unblocked paths and the blocked paths; wherein the group of paths may include at least one unblocked path and does not include any blocked path; and (d) transmitting at least one additional group of short messages over the group of paths of the network.

The at least one additional group of short messages may include more short messages than the first group of short messages.

The at least one additional group of short messages may include at least ten times more short messages than the first group of short messages.

The group of paths may include trusted paths that may not be included in the first plurality of paths.

The method may include determining paths that may be trusted paths.

The determining may be based on outcomes of previous attempts to send short messages over the paths.

The network may be a Short Message Peer-to-Peer (SMPP) network.

The path identifier of a given path may be indicative of at least one entity out of a routing entity and a message center associated with the given path.

The path identifier of a given path may be indicative of a network port and at least one entity out of a routing entity and a message center associated with the given path.

The selecting of the group of paths may be also responsive to a cost associated with a transmission of short messages over unblocked paths.

The cost may represent a network behavior associated (for example congestions) with a transmission of short messages over unblocked paths. Additionally or alternatively the cost may represent a fee charged by a vendor for transmitting the short message.

The different short messages of the first group may include links that differ from each other by their URL.

The at least one additional group of short messages may include more short messages than the first group of short messages.

The computer program product may store instructions for determining paths that may be trusted paths.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Any reference to a method should be applied mutatis mutandis to a computer program product that stores instructions that cause a system to execute the method, and should be applied mutatis mutandis to a system configured to execute the method.

Any reference to a computer program product should be applied mutatis mutandis to a method that is performed by a system when executing the instructions stored in the computer program product, and should be applied mutatis mutandis to a system configured to execute the instructions stored in the computer program product.

Any reference to a system should be applied mutatis mutandis to a computer program product that stores instructions that cause the system to execute a method, and should be applied mutatis mutandis to a method executable by the system.

A computer program product is a hardware entity that stores instructions. The computer program product may be a volatile memory, a non-volatile memory, and the like. It may include one or more integrated circuits, may be included in an integrated circuit, may be a disk, a tape, and the like.

Figure 1:
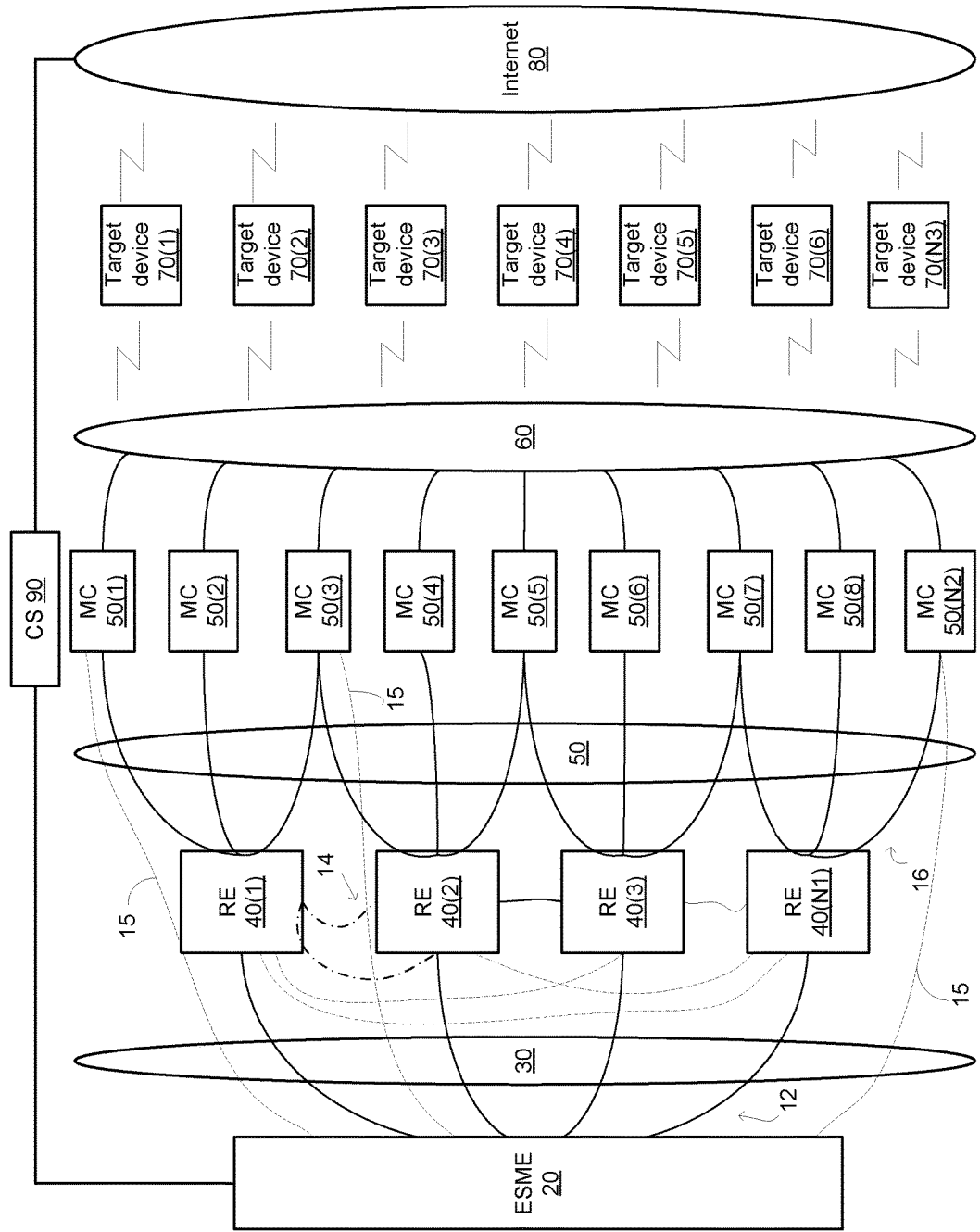
FIG. 1 is an example of a SMPP network, multiple target devices and a system.

FIG. 1 illustrates an example of a SMPP network, multiple target devices and a system.

The SMPP network is a non-limiting example of a network that supports short message services.

The target devices may include mobile communication devices (such as but not limited to smartphones), electronic devices such as but not limited to vending machines or any other device that has a mobile network communication module.

The SMPP network includes ESME 20, one or more intermediate networks 30 and 50, a first number (N1) of Routing Entities (REs) 40(1)-40(N1), a second number (N2) of Message Centers (MCs) 50(1)-50(N2), mobile network 60, a third number (N3) of target devices 70(1)-70(N3), the Internet 80 and a computerized system 90. N1, N2 and N3 are integers.

The one or more intermediate networks 30 may be TCP/IP networks, X25 networks and the like.

ESME 20 is coupled to REs via SMPP links 12.

ESME 20 is coupled to MCs via SMPP links 15.

The Routing Entities are coupled to each other via SMPP links 14.

The Routing Entities are coupled to Message Centers via SMPP links 16.

Mobile network 60 is coupled to the Message Centers and to the target devices 70(1)-70(N3). The mobile network 60 may be a SS7 network and may include entities such as MSC, HLR, BSC and ULR. Any other type of mobile network may be provided.

A short message that is sent from the ESME 20 towards a target device may pass through a path.

The path may not include any Routing Entity but includes a Message Center (see, for example—links 15).

The path may include a single Routing Entity and a Message Center (see, for example a combination of link 12 and link 16).

The path may include more than a single Routing Entity and a Message Center (see, for example, a combination of link 12, link 14 and link 16).

The path may or may not include a TCP/IP port (address) or any other port (address).

The target devices 70(1)-70(N3) and the computerized system (CS 90) are coupled to the Internet 80. The computerized system 90 is also coupled to the ESME or is a part of the ESME.

Figure 2:
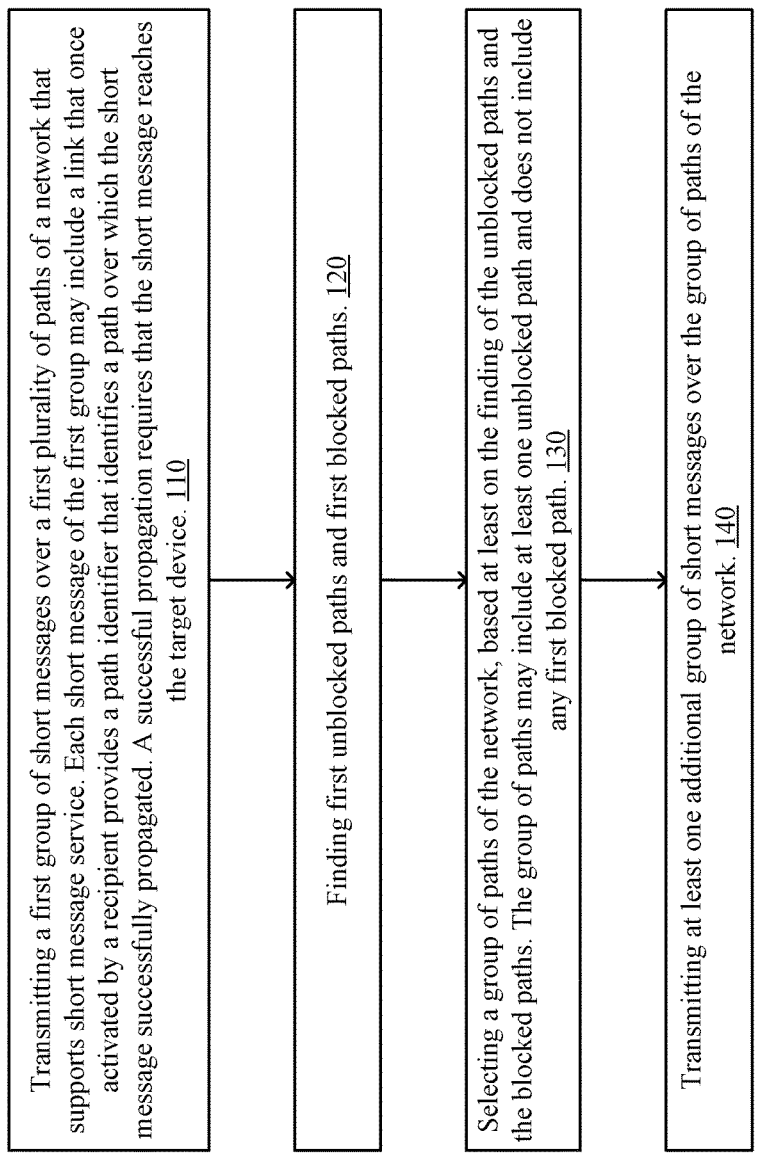
FIG. 2 is an example of a method.

The computerized system 90 may execute method 100 illustrated in FIG. 2. The computerized system may include one or more computers, one or more servers, and the like. The computerized system includes one or more hardware components such as but not limited to hardware processors and/or hardware memory units. A hardware processor may be an FPGA, an ASIC, a GUP, a CPU, a graphic processor, and the like.

It should be noted that the SMPP network is a non-limiting example of a network that supports short message service.

FIG. 2 illustrates an example of method 100.

Method 100 may start by step 110 of transmitting a first group of short messages over a first plurality of paths of a network that supports short message service.

Each short message of the first group may include a link that once activated by a recipient provides a path identifier that identifies a path over which the short message successfully propagated. A successful propagation requires that the short message reaches the target device.

Referring to the example set forth in FIG. 1—the network is the SMPP network. Different paths of the SMPP network are associated with different path identifiers.

When a short message reaches a target device (after successfully propagating over a certain path), the user (recipient) is induces to activate the link.

An activation of the link may cause the target device to access the Internet—and send an indication about the successful propagation of the short message through the certain path.

The sending of the indication may include accessing a web entity (such as a web site, a web page and the like) associated with a certain URL. The certain URL that may be dedicated to the certain path. Alternatively, indications associated with different paths may be sent to the same URL.

Figure 3:
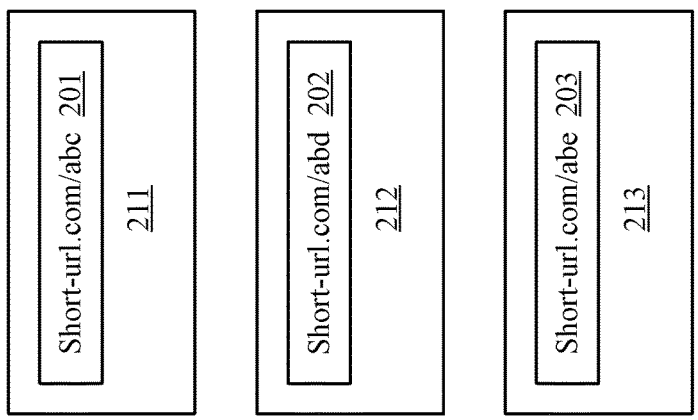
FIG. 3 is an example of short messages.

For example—referring FIG. 3—a first short message 201 (sent over a path identified by "abc") will include a link to short-url.com/abc 211, a second short message 202 (sent over a path identified by "abd") will include a link to short-url.com/abd 212, and a third short message 203 (sent over a path identified by "abe") will include a link to short-url.com/abe 213.

The indications about a successful transmission of short messages are eventually accessed by the computerized system.

It should be noted that step 110 may include sending multiple short messages over the same path—in order to get a more accurate (non-binary) success rate.

The number of short messages sent over a same path may be a tradeoff between the accuracy of the testing phase and the cost of the testing phase.

The number of short messages sent per path may be the same for all paths, or may differ between (at least) one path to another. The number of short messages transmitted over a path may be responsive to one or more parameters such as the reliability of the path.

Step 110 may be followed by step 120 of finding unblocked paths and blocked paths.

Each unblocked path is identified by an activated link that was activated in response to the transmitting of the first group of short messages.

Each blocked path is not identified by an activated link despite the transmitting of the first group of short messages.

Assuming that a short message was sent through a path that is associated with a certain TCP/IP address and (the path) includes Routing Entity 40(1) and Message Centers 50(3). The short message was successfully received by target device 70(6), and target device 70(6) activated the link—then that path is regarded as an unblocked path.

Assuming that a short message that was sent through a path that is associated with another TCP/IP address and (the path) includes Message Centers 50(1). The short message was not received by target device 70(2), and target device 70(2) did not activate the link—then that path is regarded as a blocked path.

Step 120 may be followed by step 130 of selecting a group of paths of the network, based at least on the finding of the unblocked paths and the blocked paths.

The group of paths may include at least one unblocked path and does not include any blocked path.

For example—the group of paths may include one of the unblocked paths, some of the unblocked paths or all of the unblocked paths.

The group of paths may also include one or more trusted paths. A trusted path is a path that is assumed to be unblocked. The assumption can be based on previous successful transmissions of short messages over the trusted path. Because the path is trustful—there may be no need to test it—and step 110 may not include sending a short message through the trusted path.

A path can be regarded as a trusted path based upon at least one of the following: (a) a number of successful transmissions, (b) a number of successive transmission, (c) a period during which successful transmissions were made, (d) a period during which consecutive successful transmissions were made, (e) a relationship between successful and failed transmission, attempts, and the like.

For example—a path can be regarded as a trusted path if all transmissions during a week or a month (or any other predetermined duration) were successful.

Yet for another example—a path can be regarded as a trusted path if at least ninety five percent (or any other predetermined rate) of the last two hundred (or any other predetermined number) transmissions were successful.

Sending one or more short messages during a path (during step 110) and evaluating the success of the transmission is associated with a certain cost (money and/or network resources). The determination of paths that may be regarded as trusted paths (and not be tested during steps 110 and 120) may be based also on the cost that can be saved by defining a path as a trusted path.

Steps 110, 120 and 130 may be regarded as a testing phase of method 100. The testing phase may be followed by the transmission of one or more groups of short messages.

The method may also include tracking after target devices and trying to find response patterns of target devices. For example—if a user of a certain target device tends not to open the link—then it the testing phase may include sending the short massages to another target device that is expected to activate a link that reaches the target device.

The testing phase may be repeated in random manner, in a pseudo-random manner or in a determined manner.

Additionally or alternatively, an event (for example—a certain success rate, a certain change in a success rate, a number of failed transmissions, and the like) may trigger the testing phase.

Additionally or alternatively, a next testing period may be triggered after a certain period lapsed from the last testing phase. The certain period may be fixed, may vary over time and/or may be responsive to the outcome of one or more previous testing phases.

For example—better transmission success rates may change (for example—increase) the duration between one testing phase to another.

Yet for another example—short messages of higher priority may require more frequent testing phases.

Step 130 may be followed by step 140 of transmitting at least one additional group of short messages over the group of paths of the network.

One or more short messages of the at least one additional group of short messages may or may not include links that once activated by a recipient provides a path identifier that identifies a path over which the short message successfully propagated.

The transmission of any additional group of short messages that include such links may also be regarded as an initialization of a new testing phase and step 140 may be followed by step 120.

The number of short messages transmitted during step 140 may be the same to the number of short messages transmitted during step 110—it may differ from that number.

It should be noted that transmitting more short messages during step 140 than during step 110 may be more effective—and reduces the relative cost of transmission of the short messages.

The term "and/or" is additionally or alternatively.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a pool cleaning robot as including a certain component should also cover the scenario in which the pool cleaning robot does not include the certain component. For example—any reference to a method as including a certain step should also cover the scenario in which the method does not include the certain component. Yet for another example—any reference to a pool cleaning robot that is configured to perform a certain operation should also cover the scenario in which the pool cleaning robot is not configured to perform the certain operation.

The terms "including", "comprising", "having", "consisting" and "consisting essentially of" are used in an interchangeable manner.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for monitoring reception of short messages the method comprising:
    transmitting a first group of short messages over a first plurality of paths of a network that supports short message service wherein each short message of the first group comprises a link that once activated by a recipient provides a path identifier that identifies a path over which the short message successfully propagated;
    finding unblocked paths and blocked paths wherein each unblocked path is identified by an activated link that was activated in response to the transmitting of the first group of short messages; wherein each blocked path is not identified by an activated link despite the transmitting of the first group of short messages;
    selecting a group of paths of the network based at least on the finding of the unblocked paths and the blocked paths; wherein the group of paths comprises at least one unblocked path and does not include any blocked path; and
    transmitting at least one additional group of short messages over the group of paths of the network.

2. The method according to claim 1 wherein the at least one additional group of short messages comprises more short messages than the first group of short messages.

3. The method according to claim 1 wherein the at least one additional group of short messages comprises at least ten times short messages than the first group of short messages.

4. The method according to claim 1 wherein the group of paths comprises trusted paths that are not included in the first plurality of paths.

5. The method according to claim 4 comprising determining paths that are trusted paths.

6. The method according to claim 5 wherein the determining is based on outcomes of previous attempts to send short messages over the paths.

7. The method according to claim 1 wherein the network is a Short Message Peer-to-Peer (SMPP) network.

8. The method according to claim 7 wherein a path identifier of a given path is indicative of at least one entity out of a routing entity and a message center associated with the given path.

9. The method according to claim 7 wherein a path identifier of a given path is indicative of a network port and at least one entity out of a routing entity and a message center associated with the given path.

10. The method according to claim 1 wherein the selecting of the group of paths is also responsive to a cost associated with a transmission of short messages over unblocked paths.

11. The method according to claim 10 wherein the cost represents a network behavior associated with a transmission of short messages over unblocked paths.

12. The method according to claim 1 wherein different short messages of the first group comprise links that differ from each other by their URL.

13. A computer program product that is a hardware entity that stores instructions that once executed by a computer that comprises at least one hardware processor, cause the computer to perform the steps of:
    transmitting a first group of short messages over a first plurality of paths of a network that supports short message service wherein each short message of the first group comprises a link that once activated by a recipient provides a path identifier that identifies a path over which the short message successfully propagated;
    finding unblocked paths and blocked paths wherein each unblocked path is identified by an activated link that was activated in response to the transmitting of the first group of short messages; wherein each blocked path is not identified by an activated link despite the transmitting of the first group of short messages;
    selecting a group of paths of the network based at least on the finding of the unblocked paths and the blocked paths; wherein the group of paths comprises at least one unblocked path and does not include any blocked path; and transmitting at least one additional group of short messages over the group of paths of the network.

14. The computer program product according to claim 13 wherein the at least one additional group of short messages comprises more short messages than the first group of short messages.

15. The computer program product according to claim 13 wherein the at least one additional group of short messages comprises at least ten times short messages than the first group of short messages.

16. The computer program product according to claim 13 wherein the group of paths comprises trusted paths that are not included in the first plurality of paths.

17. The computer program product according to claim 16 that stores instructions for determining paths that are trusted paths.

18. The computer program product according to claim 17 wherein the determining is based on outcomes of previous attempts to send short messages over the paths.

19. The computer program product according to claim 13 wherein the network is a Short Message Peer-to-Peer (SMPP) network.

20. The computer program product according to claim 19 wherein a path identifier of a given path is indicative of at least one entity out of a routing entity and a message center associated with the given path.

21. The computer program product according to claim 19 wherein a path identifier of a given path is indicative of a network port and at least one entity out of a routing entity and a message center associated with the given path.

22. The computer program product according to claim 13 wherein the selecting of the group of paths is also responsive to a cost associated with a transmission of short messages over unblocked paths.

23. The computer program product according to claim 22 wherein the cost represents a network behavior associated with a transmission of short messages over unblocked paths.

24. The computer program product according to claim 13 wherein different short messages of the first group comprise links that differ from each other by their URL.

* * * * *